June 16, 1925.

R. B. DALEY

PHONOGRAPH TONE ARM

Filed March 24, 1922  4 Sheets-Sheet 1

1,542,374

Inventor
R.B.Daley
Williams Bradbury
McCabe & Pierce  Attys

June 16, 1925. 1,542,374
R. B. DALEY
PHONOGRAPH TONE ARM
Filed March 24, 1922 4 Sheets-Sheet 2

Inventor
R. B. Daley
Williams Bradbury
McCalib & Price Attys

June 16, 1925.

R. B. DALEY

PHONOGRAPH TONE ARM

Filed March 24, 1922

Inventor
R. B. Daley
Williams Bradbury
McCabe & Finn Attys.

June 16, 1925.  1,542,374
R. B. DALEY
PHONOGRAPH TONE ARM
Filed March 24, 1922   4 Sheets-Sheet 4
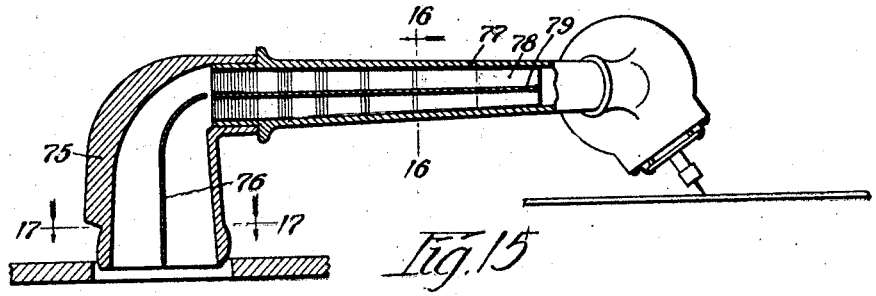
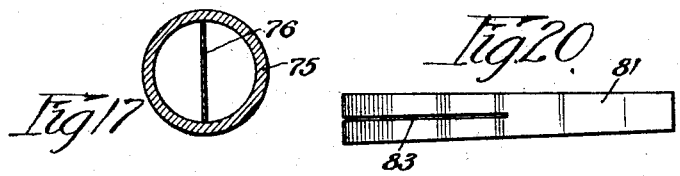
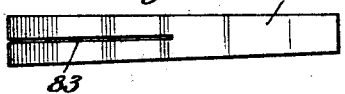
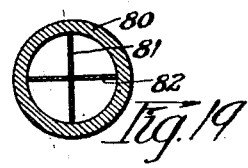
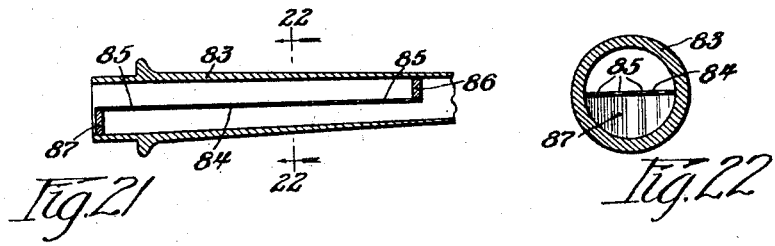
Inventor
R. B. Daley Patented June 16, 1925.

1,542,374

UNITED STATES PATENT OFFICE.

ROLAND B. DALEY, OF CHICAGO, ILLINOIS.

PHONOGRAPH TONE ARM.

Application filed March 24, 1922. Serial No. 546,302.

*To all whom it may concern:*

Be it known that I, ROLAND B. DALEY, a citizen of the United States, and resident of Chicago, in the county of Cook and State of Illinois, have invented certain new and useful Improvements in Phonograph Tone Arms, of which the following is a full, clear, concise, and exact description, reference being had to the accompanying drawings, forming a part of this specification.

This invention relates to phonograph apparatus, and particularly to the tone arm, and its support.

The object of the invention is to provide an improved tone arm, and also improved supporting means and counter-balancing means therefor.

One feature of the invention resides in the support for the tone arm elbow, and the provision therein of means for equalizing or taking up the wear of the balls and ball race of the bearing.

Another feature resides in the means provided for varying the pressure of the needle of the reproducer on the record.

Another feature of the invention is the provision of bracing webs in the passage of the tone arm to render the tone arm walls more rigid so as to prevent vibration thereof, and still another feature is the provision of means in association with one type of bracing web whereby the sound waves are forced to pass through a plurality of perforations in the strengthening web, thus clarifying the sound.

Other features and advantages will appear from time to time as the description of the invention progresses.

Referring now to the drawings which show the preferred embodiments of applicant's invention, Figure 1 is a plan view of the tone arm partly in section, and the reproducer in a position to play lateral cut records;

Figure 2 is a side elevation of the arrangement of Figure 1.

In both Figures 1 and 2, the reproducer is shown in its needle changing position in dotted lines.

Figure 15 is a vertical sectional view of the tone arm showing the strengthening webs in place;

Figure 16 is a cross section on the line 16—16 of Figure 15;

Figure 17 is a section on the line 17—17 of Figure 15;

Figure 18 is a vertical sectional view of the tone arm extension showing a modified type of strengthening web;

Figure 19 is a section on the line 19—19 of Figure 18;

Figure 20 shows one of the strengthening webs used in the modification of Figure 18;

Figure 21 shows a still further modified form of strengthening web with the means associated therewith for causing the sound to filter through perforations in the strengthening web, and Figure 22 is a section on the line 22—22 of Figure 20.

Figure 1:
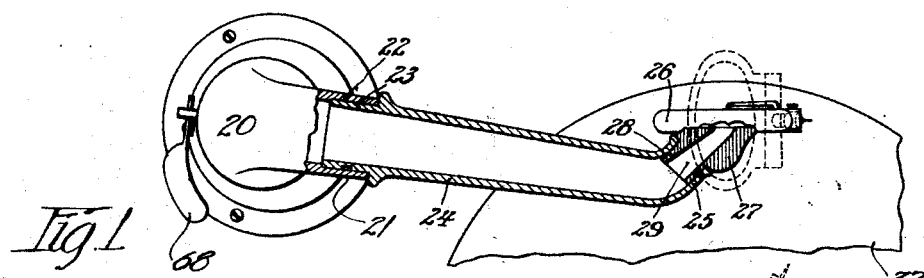

It is thought that this invention will be best understood by a detailed description thereof taken in connection with the drawings.

Referring now to the drawings, in which like reference characters in the several views indicate like parts, at 20 is shown the vertically extending portion of the tone arm elbow which has integral therewith the laterally extending portion 21. The portion 21 is provided with the internal annular recess 22 within which is received the reducing end portion 23 of the tone arm extension member 24. The connection between the parts 21 and 23 is such that the tone arm extension 24 may be readily rotated with respect to the tone arm elbow member 21. Any desired or appropriate means may be provided for limiting the rotary movement of the part 23 within the recess 22 and for providing a substantially constant frictional engagement between the two parts. Suitable means for this purpose will be subsequently described in connection with the modification shown in Figures 5 and 6.

The tone arm extension 24 terminates at one end in a portion 25, the axis of which extends at an oblique angle to the axis of the member 24. The reproducer shell 26 has an exit stem 27 provided with a reduced portion 28 telescopically received within the angularly extending portion 25 of the tone arm extension. It will be noted that the axis of the sound exit channel 29, and also the axis of the stem 27, is arranged at an acute angle to the plane of the reproducer diaphragm. This angle is preferably substantially 40°.

This invention does not relate to the diaphragm, needle support or any of the moving parts associated with the reproducer shell. Any desired or approved type of this mechanism may be employed.

The exit stem 27 is rotatable with regard to the tone arm extension, and any suitable or desired means may be provided to limit the relative rotation of these parts, one to the other, or to provide constant frictional engagement between the two. Suitable means for this purpose will be subsequently described.

Figure 2:
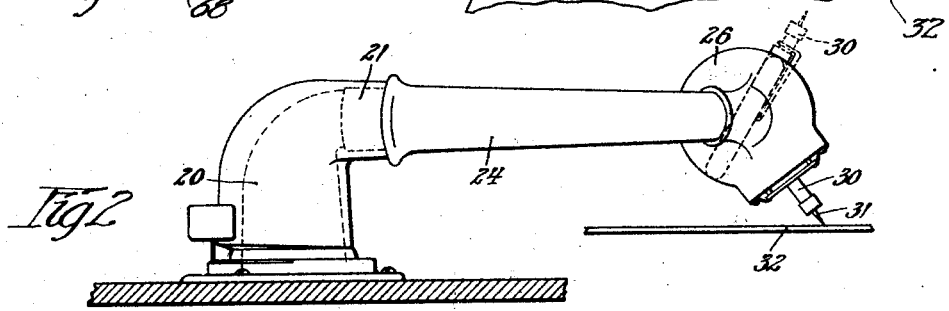

In Figures 1 and 2, the reproducer is shown in solid lines in a position for playing lateral cut records. In this position it will be noted that the plane of the diaphragm passes through the axis of rotation of the vertically extending portion 20 of the tone arm elbow. It will also be noted by reference to Figure 2, that the needle socket 30 and needle 31 are arranged at an angle of approximately 55° to the surface of the record 32. It is desirable to have the axis of the reproducer exit channel substantially intersect the axis of the diaphragm and the axis of the needle and needle socket. In other words, the axis of the exit channel, the axis of the needle socket and the axis of the diaphragm should all pass substantially through a common point.

Figure 3:
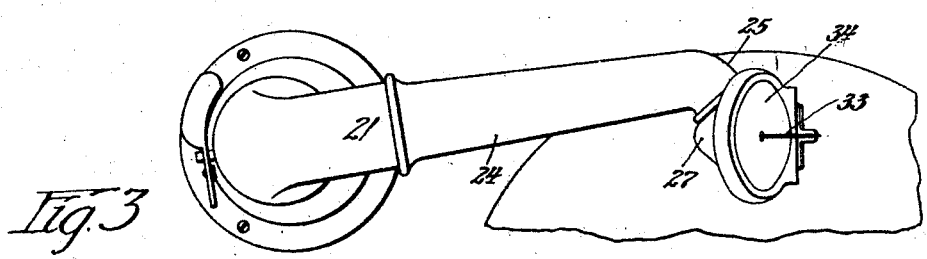
Figure 3 is a plan view of the device of Figures 1 and 2, but showing the reproducer in a position for playing hill and dale records.

It will be seen by reference to Figures 1, 2 and 3, that the axis of the tone exit channel 29 passes through the plane of the diaphragm at substantially the point where the stylus bar 33 is attached to the diaphragm 34.

It will also be noted from an inspection of Figure 1 of the drawings, that the vertical plane passing through the axis of the exit channel 29 passes much nearer to the needle point than would be the case if the exit channel extended at an angle of substantially 90° to the plane of the diaphragm. Thus the turning movement of the force exerted on the needle point by the record will be less and the danger of displacement of the reproducer and chattering thereof is materially reduced.

The needle changing position of the reproducer and needle is shown in dotted lines in Figures 1 and 2. The reproducer is placed in needle changing position by rotating the stem 27 with relation to the tone arm extension 24. It will be noted that when the reproducer is in needle changing position, it lies at an angle of substantially 90° with regard to its playing position. Also, it will be noted that the needle, when the reproducer is in changing position, lies immediately over the position it occupies when in playing position. When in needle changing position, the needle will point upwardly and outwardly, thus making it exceedingly convenient to change the needle.

Figure 4:
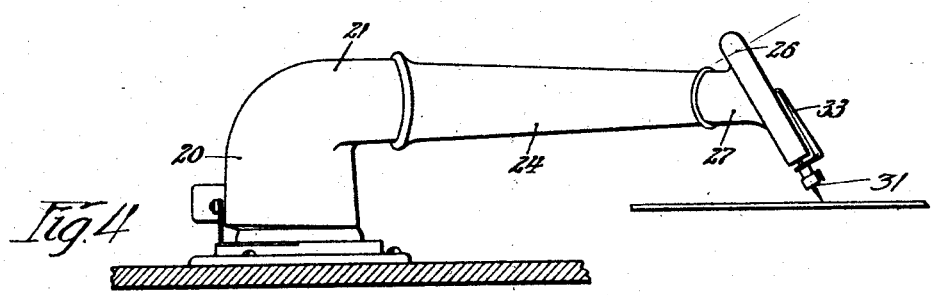
Figure 4 is a side elevation of the device of Figure 3.

The reproducer is shown in a position to play hill and dale records in Figures 3 and 4. The change from the position of Figures 1 and 2 to that of Figures 3 and 4 is accomplished by first rotating the reproducer to the needle changing position, as above described, and then rotating the extension arm 24 substantially 180° in relation to the tone arm elbow. The character of the sound passage through the tone arm is in no wise altered by the change of the reproducer from a position to play lateral cut records to a position to play hill and dale records.

In applicant's device, only one movement, in addition to moving the reproducer to needle changing position, is necessary in changing the reproducer from a position to play lateral cut records to a position to play hill and dale records, or vice versa. In any instance, it is necessary to move the reproducer to needle changing position in order to change the needle. Having moved the reproducer to needle changing position, but one movement is necessary, a rotary movement of the tone arm extension, in order to place the reproducer in a position to play the other type of record. As a matter of fact, assuming that one uses the type of needle which must be changed after each record is played, no more movement is necessary to insert a new needle. Thus the number of movements required to change the reproducer from a position to play one type of record to the position to play the other type is reduced to the minimum.

When the reproducer has been changed to play hill and dale records, the needle is arranged at substantially the same angle to the record as when used in playing lateral cut records, namely, substantially 55°, and is positioned the same distance from the axis of rotation of the tone arm elbow. Also, it will be noted from Figure 3 that a plane at right angles to the diaphragm and passing through the needle socket intersects the axis of rotation of the tone arm elbow. This feature of having the plane of the diaphragm pass through the axis of rotation of the tone arm when arranged to play lateral cut records, and of being so positioned, when arranged to play hill and dale records, that a plane at right angles to the diaphragm through the needle socket passes through the axis of rotation of the tone arm is very desirable.

It is also exceedingly desirable that the needle should be positioned the same distance from the axis of rotation of the tone arm elbow when playing one kind of record as when playing the other, as by this arrangement the needle may be caused to engage the record approximately along the radius of the record which extends at approximately right angles to a line joining the axis of rotation of the tone arm to the needle. In other words, the plane of the diaphragm of the reproducer of Figures 1 and 2 will be positioned substantially tangential to the record groove, and the plane at right angles to the reproducer diaphragm passing through the needle socket will be substantially tangential to the record groove when arranged as in Figures 3 and 4. Of course, due to the arc which the needle travels in its movement from the outer edge of the record toward the center, this tangential arrangement is not true for all positions but may be approximated for all positions.

Figure 5:
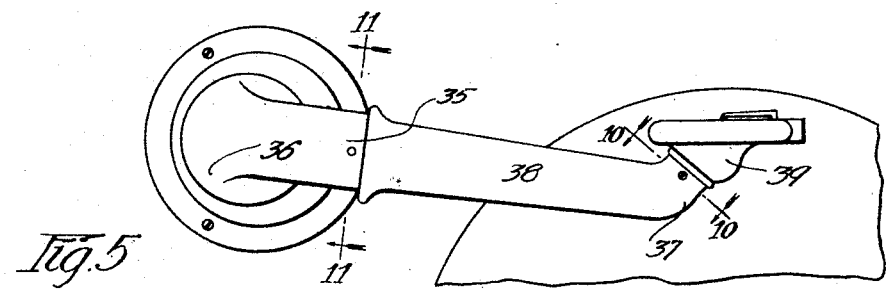
Figure 5 is a plan view of a modified form of tone arm.
Figure 6:
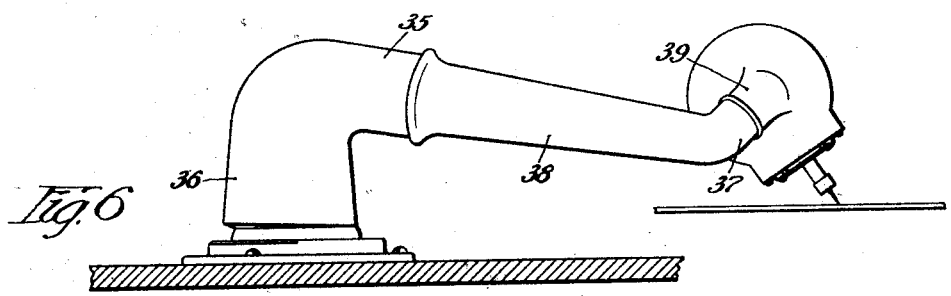
Figure 6 is a side elevation of the tone arm of Figure 5.

The modification shown in Figures 5 and 6 is very similar to that shown in Figures 1 to 4, the only difference being that the tone arm elbow has its laterally extending portion 35 arranged at an angle of less than 90° to the vertically extending portion 36. Also, the angularly extending portion 37 of the tone arm extension 38 is arranged at a slightly different angle to the tone arm extension than are the similar parts in Figures 1 to 4. The operation and results obtained by the structure of Figures 5 and 6 is very similar to that above described. However, in changing from a position to play lateral cut records to a position to play hill and dale records, the tone arm extension need not be rotated through so great an angle. It will be recalled that the tone arm extension 24 was rotated substantially 180° in the change from a position to play lateral cut records to a position to play hill and dale records. In the arrangement of Figures 5 and 6, the tone arm extension need be rotated only about 120°. The arrangement of the extension 37 and the reproducer stem 39 is also slightly different in that the extension 37, when in a position to play lateral cut records, inclines slightly upwardly, and the reproducer stem 39 inclines slightly downwardly so that the axes of the sound passage through the part 37 and through the part 39 are coincident.

It will be understood that the extension member 38 is telescopically received by the member 35, and that the reproducer stem 39 is telescopically received by the angularly extending member 37 in the same manner as has been described in connection with Figure 1.

Figure 10:
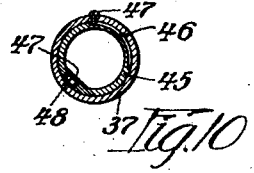
Figure 10 is a section on the line 10—10 of Figure 5.
Figure 11:
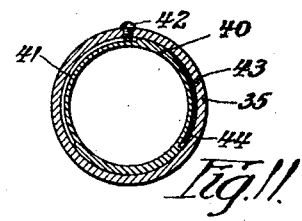
Figure 11 is a section on the line 11—11 of Figure 5.

The details of the telescopic arrangement between the parts of Figure 5 are shown in Figures 10 and 11. In Figure 11, 40 indicates the reduced portion of the extension member 38 which is received within the end of the member 35. If desired, the portion 40 may be provided with a circumferential groove 41 into which projects a screw 42 inserted through the member 35. This arrangement acts to prevent the tone arm extension being withdrawn from the elbow, and also acts to limit the rotary movement of one relative to the other. In order that the frictional engagement of these parts may be maintained substantially constant and take up the wear which occurs, the member 40 may be provided with a groove 43 within which is placed a flat spring 44 formed as the arc of a circle somewhat smaller than the inner circumference of the member 35.

In Figure 10 is shown the nature of the connection between the parts 39 and 37. The reduced portion 45 of the part 39 may be provided with a circumferential groove 46 into which may project a screw 47 carried by the part 37. This arrangement of Figures 10 and 11 may advantageously be applied to the structure of Figures 1 to 4, although any other suitable means may be substituted therefor.

Figure 7:
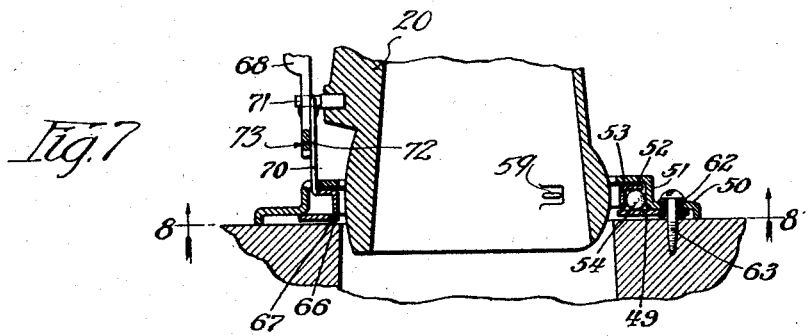
Figure 7 is a vertical sectional view through the base of the tone arm elbow and its supporting bearing.
Figure 8:
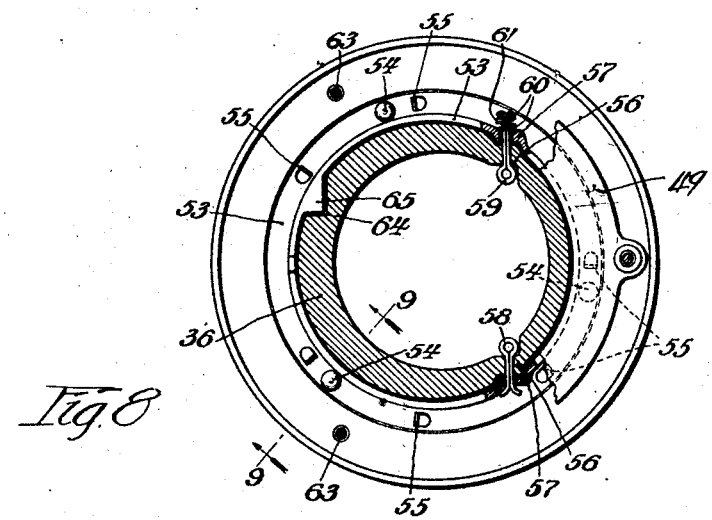
Figure 8 is a transverse sectional view on the line 8—8 of Figure 7 looking in the direction of the arrows.
Figure 9:
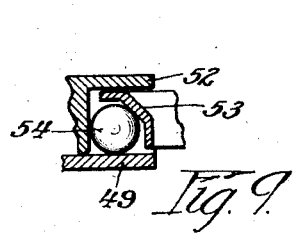
Figure 9 is a sectional view through the raceway of the ball bearing substantially on the line 9—9 of Figure 8.

As is usual, the tone arm elbow 36 is so supported as to be rotatable about its vertical axis and also to permit the extension 35 to move vertically to permit the needle to be placed on or removed from the record, and also permit the needle to maintain a constant engagement with the record while the record moves slightly up and down during its rotary movement, as is usual. The details of the supporting means for the tone arm elbow are shown in Figures 7, 8 and 9. The ball raceway of the supporting means is formed of an annular ring 49 which forms the base of the raceway and a housing member 50 provided with a vertically extending portion 51 which forms one side of the raceway and a laterally extending top portion 52 which overlies but does not engage the ball ring 53. 54 indicates one of the balls of the bearing.

Referring now to Figure 8, it will be noted that the member 53 is provided with three pairs of punched out and downturned lugs 55. Between each pair of lugs is positioned one of the balls 54. Lugs 55 act merely to limit the movement of the balls 54 and insure that the tone arm will be suspended at three points as on a tripod. The tone arm elbow is provided with an offset portion 56, and the ring 53 is provided with a corresponding offset portion 57. Aligned openings are provided in the offset portions 56 and 57 through which extend the cotter pins 58 and 59. The cotter pin 59 is provided with a pair of washers 60 between which is positioned a spiral spring 61, the whole being maintained on the cotter pin by the end of the cotter pin arms being separated. The spring 61 acts to maintain the tone arm elbow 36 in engagement with the ball ring 53.

If desired, a spring, such as 61, may be placed about each of the cotter pins. Instead of employing the cotter pins shown in the drawing as the means for pivotally supporting the tone arm on the ring, screws may be substituted, it being only necessary to place each of the screws through an opening in one of the members and engage the screw threaded portion of the screw with a screw threaded opening in the other member.

The ball ring 53, it will be noted, as shown in Figure 7, is angular in formation and engages both the top and one side of the ball 54. However, the ring 53 through a portion of its circumference which is arranged to engage one of the balls 54 has a beveled formation, as shown in Figure 9. If desired, the ring 53, where formed to engage the third ball, may be provided with an arcuate engaging surface instead of the beveled engaging surface shown in Figure 9. If desired, the ring 53 may be provided with a formation of the general character of that shown in Figure 9 where it is arranged to engage two of the balls 54, but the arrangement wherein this contour is provided to engage only one ball is believed to be preferable.

The base member 49 and the housing member 50 are provided with aligned openings through which extend the hollow rivets 62. The screws 63 which secure the tone arm to the instrument board may pass through the center of the hollow rivets 62, thus securely maintaining all the parts together.

In order to limit the vertical movement of the tone arm, the elbow 36 is provided in one side thereof with a notch or groove 64 into which projects a lug or point 65 integral with the ring 53. The vertical movement of the tone arm is limited by the lug 65 engaging the top and bottom respectively of the groove 64. In order to limit the rotary movement of the tone arm, the ring 53 is provided with a lug 66 which extends downwardly into a notch 67 formed in the inner edge of the base member 49. The engagement of the lug 66 with the ends of the notch 67 operates to limit the rotary movement of the tone arm in a manner which may be readily understood.

In order to secure the best results, it is necessary to provide means for changing the pressure of the needle on the records when playing records of different types. One of the well known records on the market produces best results when the needle engages the record with a pressure of substantially four and one-quarter ounces; another well known record under the most favorable conditions has the needle arranged to engage the record with a pressure of about five and one-quarter ounces; still another well known make of record plays best when the needle engages the record with a pressure of from six and one-half to seven ounces. Devices have been designed for changing the pressure of the needle on the record, but many of these devices are objectionable for various reasons. Some of these pressure changing devices are exceedingly heavy and cumbersome; others act to give a side thrust to the tone arm; others have other inherent objections. For this reason, many of the phonographs which are provided with universal tone arms and reproducers merely adjust the pressure of the needle about midway of the two extremes and trust that the device will give satisfactory performance with all the various types of records.

Figure 12:
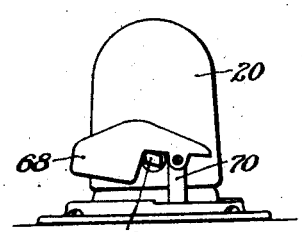
Figure 12 is a rear view of the tone arm showing the reproducer counterbalancing weight in one of its operative positions in which it acts to decrease the pressure of the reproducer needle on the record.
Figure 13:
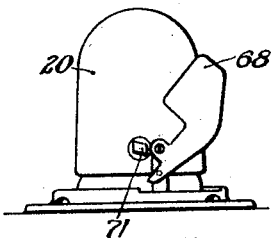
Figure 13 is a similar view but showing the counterbalancing weight in inoperative position.
Figure 14:
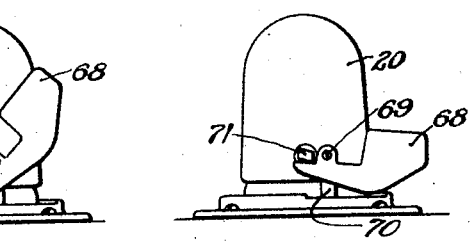
Figure 14 is a view similar to Figure 12, but showing the counterbalancing weight in a position to increase the pressure of the reproducer needle on the record.

Applicant discloses in Figures 7, 12, 13 and 14 a needle pressure changing device which is light in weight, is mounted at the back of the tone arm where it is inconspicuous, and which does not act to produce any noticeable side thrust on the tone arm. This mechanism comprises a weighted lever 68 which is pivotally secured by means of the screw 69 to the upwardly extending bar 70 carried by the ball ring 53, as shown in Figure 7. The bar 70 extends through a slot formed in the horizontal member 52 of the bearing housing member 50. The tone arm, at the rear thereof, and substantially in the vertical plane which passes through the axis of the tone arm, is provided with a projecting lug 71. When the weighted lever 68 is turned to the left, as shown in Figure 12, it engages on the top of the lug 71, pressing the rear portion of the tone arm elbow downwardly and thus decreasing the pressure on the needle. Due to the fact that a leverage is obtained by the construction shown, the pressure downwards on the lug 71 may be made many times as great as the weight of the member 68. This arrangement may be readily adjusted by increasing the distance between the pivot point and the weight, or between the pivot point and the lug 71. When, however, the weight 68 is turned to its reverse position, as shown in Figure 14, the end of the lever 68 engages on the under side of the lug 71 and tends to force the rear side of the tone arm elbow upwardly, thus increasing the pressure of the needle point on the record. The lug 71 is shown having a bearing point at the upper side farther from the pivot 69 than is the bearing point on the lower side, so that the decrease in pressure due to placing the weight in the position of Figure 12 will be less than the increase in pressure due to placing the weight as shown in Figure 14. Instead of a lug 71, as shown in the drawings, a single pin or a pair of pins may be substituted as required.

In Figure 13, the weighted lever 68 is shown in neutral position, that is, in a position where it has no effect on the pressure of the needle on the record. In order to maintain the lever in this position, the bar 70 is provided with an outwardly extending bead 72, and the end of the lever 68 is provided with a depression 73 adapted to engage the bead and retain the lever in its inoperative position. The engagement and disengagement of the depression 73 with the bead 72 is permitted, due to the resiliency of the bar 70.

Thus, three different pressures of the needle on the record may be obtained by the means disclosed—one the normal pressure produced by the uninfluenced tone arm, another the decreased pressure due to the lever bearing down on the rear of the tone arm elbow, and the third due to the lever bearing upwardly on the rear of the tone arm elbow. If desired, the pin or lug on the rear of the elbow may be made adjustable as by providing a series of holes in the tone arm at different distances from the pivot of the lever in any one of which the pin may be placed. Another manner of adjusting the degree of influence which the weight will have on the needle pressure on the record is to adjustably mount the weight on the weight arm so that its distance from the pivot may be changed at will. Due to the leverage provided by this structure, the pressure changing device may be caused to exert a pressure on the tone arm many times greater than its own weight.

It has been found that under certain conditions, a better quality of reproduction is produced by providing the tone arm with internal strengthening webs which extend laterally across the sound channel. These webs make the external walls of the tone arm more rigid by their bracing action, and also operate to break up the sound channel into a plurality of channels so as to prevent the formation of sound eddies within the tone arm.

In Figure 15, the sound arm elbow 75 is shown as provided with a transverse strengthening web 76. The web 76 may be positioned within the sound arm elbow in any desired or preferred manner. One means which applicant has found satisfactory is to form the web of sheet metal, fibre, or other suitable material, and then force it into the elbow to the position indicated in Figures 15 and 17.

The tone arm extension 77 of Figure 15 is shown provided with a pair of strengthening webs 78 and 79 which intersect each other at right angles along the axis of the sound channel. The strengthening webs 78 and 79 in the form shown in Figure 16 may be formed by die casting the tone arm extension and strengthening webs. In this process, the core used in die casting will be the usual cylindrical core slightly tapered, but instead of being one integral mass, it will consist of four quadrants which are spaced slightly apart so as to provide the spaces therebetween for the webs. Instead of the intersecting webs a single web may be used.

In Figure 18 a tone arm extension 80 is shown provided with the intersecting strengthening webs 81 and 82. This structure is similar to that shown in Figure 15 except the strengthening webs in this arrangement are inserted in the tone arm extension and are not die cast therein. The web plates 81 and 82 are formed of a size to fit within the extension arm, and each of them is then split for half of its length, one from one end and the other from the other end along their axes. The two parts are then placed together with the slot of one engaging the solid portion of the other in a manner which will be well understood. Figure 20 shows one of the plates 81 provided with a slot 83. The other one of the strengthening web plates 82 will be provided with a similar slot, but it will be in the right half of the web plate instead of in the left half, as indicated in Figure 20. The web plates 81 and 82 after being placed in the proper relative position may be rigidly secured together by soldering along the line of intersection.

Figure 21 shows a tone arm extension 83 provided with a single strengthening web 84. Web 84 may be formed of metal, fibre, or any other suitable or desired material. After having provided the web 84 with a large number of openings, as 85, the plate will be snugly inserted within the tone arm extension. At the ends of the plate and between the plate and the wall of the tone arm extension are provided substantially semi-cylindrical blocks 86 and 87, one on one side and the other on the opposite side of the strengthening web 84. Thus, the sound entering the tone arm extension from the right in Figure 21 will be forced to pass on the lower side of the web 84, as seen in this figure, and up through the perforations 85 within the web 84. This structure acts to break up any sound eddies which may form in the tone arm and under certain conditions acts to greatly clarify the reproduction. The equivalent of the blocks 86 and 87 may be provided by terminating the opposite ends of the web in substantially semi-cylindrical portions which may be bent at right angles to the plane of the web and in opposite directions. Thus, when the web is inserted in the arm, these angularly bent portions will close the passage between the web and tone arm wall in substantially the same manner as blocks 86 and 87.

The preferred embodiment of applicant's tone arm and one modification have been described above. Many other modifications are possible, but these several modifications all consist merely in varying the angles between the vertically extending portion of the tone arm elbow and the forwardly extending portion, changing the angle of the turn in the tone arm extension and slightly changing the angle of the axis of the tone exit channel to the diaphragm. Modifications of the needle pressure changing device are also possible. One obvious modification would be to pivot the pressure varying lever to the tone arm and cause it to engage a pin carried by the bar which projects upwardly from the ball ring. Other modifications of the idea would doubtless present themselves to one skilled in the art. Applicant contemplates modifications other than those set forth above, and it is, therefore, to be understood that the invention is to be limited merely by the scope of the appended claims.

Having now described my invention, what I claim is new and desire to secure by Letters Patent of the United States is:

1. In a phonograph, the combination of a tone arm having one end loosely fitting within a collar with trunnions joining the tone arm to the collar to permit the tone arm to move in a vertical plane, the axis of said trunnions being parallel with but spaced from a diameter of said collar, the portion of the tone arm within said collar having two opposite sides of different curvature to permit said arm to move within and at all times adjacent to said collar but without touching it.

2. In combination, a phonograph tone arm, a metal collar surrounding said tone arm, said collar and tone arm being provided with correspondingly positioned offset or flattened parallel portions, and trunnions extending through said parallel portions respectively whereby said arm is supported on said collar.

3. In a phonograph, the combination of a tone arm having one end loosely fitting within a collar with trunnions joining the tone arm to the collar to permit the tone arm to move in a vertical plane, the axis of said trunnions being parallel with but spaced from a diameter of said collar, the portion of the tone arm within said collar having two opposite sides of different curvatures, the curvatures of said sides being along the arcs of circles, the radii of which are the distances, respectively, from said sides to said axis of said trunnions.

4. In a phonograph, the combination of a tone arm having one end loosely fitting within a collar with trunnions joining the tone arm to the collar to permit the tone arm to move in a vertical plane, the axis of said trunnions being parallel with but spaced from a diameter of said collar, the portion of the tone arm within said collar having two opposite sides of different curvatures, the curvatures of said sides being along the arcs of circles, the radii of which are the distances, respectively, from said sides to said axis of said trunnions, the portions of said tone arm within said collar and between said opposite sides being provided with surfaces, the curvature of which gradually changes from that of one of said opposite sides to that of the other.

5. In a phonograph, a tone arm, a support for said tone arm, a pivotal connection between said tone arm and said support allowing movement of the tone arm in a vertical plane, a projection from said tone arm, another projection from said support, and a weighted lever pivoted to one of said projections and capable of engagement with either the top or bottom of the other said projection.

6. In a phonograph, a tone arm, a support on which said tone arm is pivotally mounted, and a weighted lever pivotally joined to said support and capable of being placed in either of three positions, a neutral position where it is supported entirely by said support, a second position where it engages the tone arm so as to force the adjacent portion of the tone arm downwardly, and a third position where it engages the tone arm so as to force the adjacent portion of the tone arm upwardly.

7. In a phonograph, a tone arm, a support on which said tone arm is pivotally mounted, a weighted lever pivotally supported on said support, and a projection extending outwardly from the rear surface of said arm, said weighted lever being so arranged that in one position it may engage said projection upon the top thereof, and in another position engage said projection on the bottom thereof, the portion of said projection engaged by the arm in one position being farther from the pivotal support of said arm than the point engaged by said arm when in the other position.

8. A phonograph tone arm, a strengthening web positioned within said tone arm, said web being provided with a plurality of openings, and means for closing the passage between opposite ends of said web and the tone arm on the opposite sides of said web.

In witness whereof, I hereunto subscribe my name this 21st day of March, 1922.

ROLAND B. DALEY.

Witnesses:
DAGMAR PETERSON,
EMILE J. BOURGEOIS.